(12) United States Patent
Oswalt

(10) Patent No.: US 9,275,543 B2
(45) Date of Patent: Mar. 1, 2016

(54) TAMPER DETECTION FOR PULSE-PRODUCING DEVICE

(71) Applicant: Chris Oswalt, Johns Creek, GA (US)

(72) Inventor: Chris Oswalt, Johns Creek, GA (US)

( * ) Notice: Subject to any disclaimer, the term of this patent is extended or adjusted under 35 U.S.C. 154(b) by 271 days.

(21) Appl. No.: 13/803,610

(22) Filed: Mar. 14, 2013

(65) Prior Publication Data

US 2013/0285833 A1  Oct. 31, 2013

Related U.S. Application Data

(60) Provisional application No. 61/638,508, filed on Apr. 26, 2012.

(51) Int. Cl.
| | |
|---|---|
| *G08C 19/16* | (2006.01) |
| *G06F 21/86* | (2013.01) |
| *G01R 22/06* | (2006.01) |
| *G01D 4/00* | (2006.01) |
| *G01D 4/02* | (2006.01) |

(52) U.S. Cl.
CPC .............. *G08C 19/16* (2013.01); *G06F 21/86* (2013.01); *G01D 4/002* (2013.01); *G01D 4/02* (2013.01); *G01R 22/061* (2013.01); *G01R 22/063* (2013.01); *G01R 22/065* (2013.01); *G01R 22/066* (2013.01)

(58) Field of Classification Search
CPC ......... G08C 19/16; G01D 4/002; G01D 4/02; G01R 22/061; G01R 22/063; G01R 22/065; G01R 22/066

USPC ............ 340/870.01, 870.02, 870.07, 870.09, 340/870.19; 702/57, 58; 235/435, 437; 324/110

See application file for complete search history.

(56) References Cited

U.S. PATENT DOCUMENTS 4,357,601 A * 11/1982 McWilliams .................. 340/506
4,491,782 A *  1/1985 Bellis et al. .................... 324/533

* cited by examiner

*Primary Examiner* — Hai Phan
*Assistant Examiner* — Franklin Balseca
(74) *Attorney, Agent, or Firm* — Kilpatrick Twonsend & Stockton LLP

(57) ABSTRACT

Systems and methods for detecting tampering with a pulse-producing component of an electrical device are disclosed. An example electrical device includes a pulse-producing circuit and a tamper detection circuit. The pulse-producing circuit is configured for generating at least one pulse. The pulse-producing circuit includes a pulse interface via which the at least one pulse is communicated from the pulse-producing circuit. The tamper detection circuit is electrically connected to the pulse interface. The tamper detection circuit can be connected between a pulse-counting device and the pulse interface. The tamper detection circuit is configured for communicating the pulse to the pulse-counting device via at least one electrical path in the absence of a tampering condition. The tamper detection circuit is also configured for simulating damage to the pulse interface by modifying the at least one electrical path in response to the presence of the tampering condition.

19 Claims, 14 Drawing Sheets

Prior Art

Prior Art
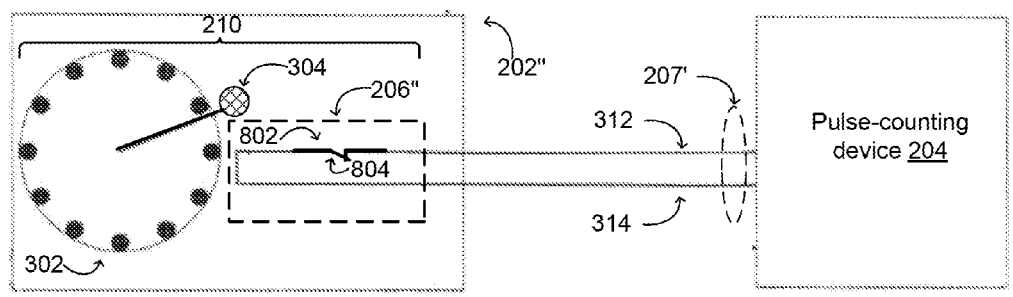
FIG. 23
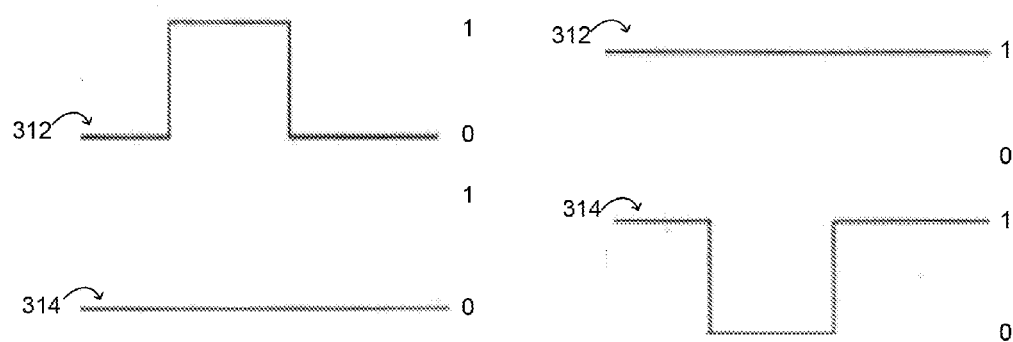
FIG. 24 Prior Art     FIG. 25 Prior Art

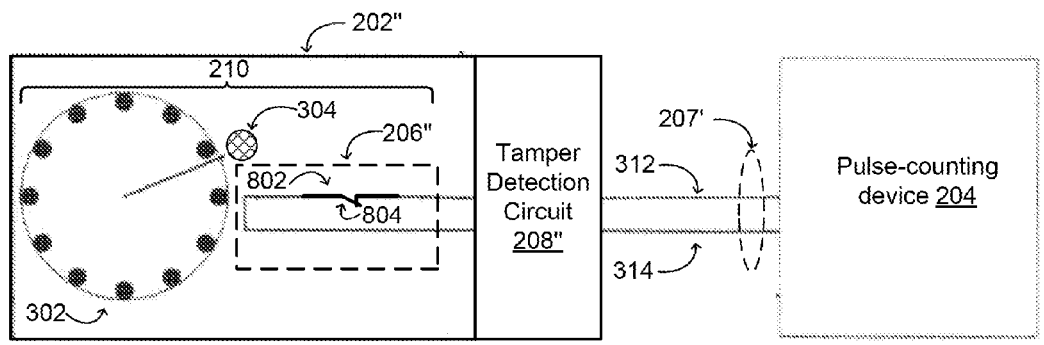
FIG. 26
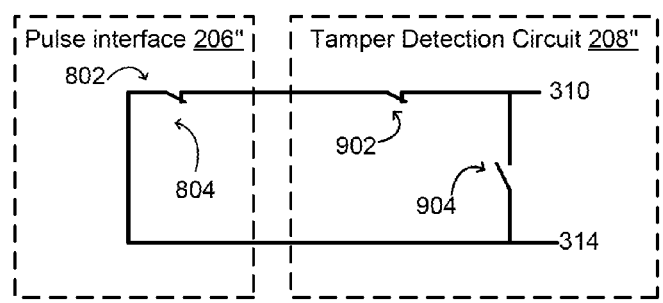
FIG. 27
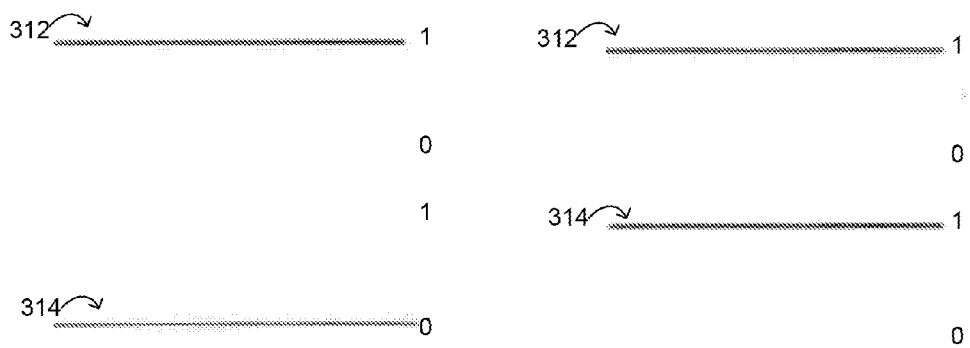
FIG. 28     FIG. 29

Prior Art

TAMPER DETECTION FOR PULSE-PRODUCING DEVICE

CROSS REFERENCE TO RELATED APPLICATION

This application claims priority to U.S. Provisional Application Ser. No. 61/638,508 filed Apr. 26, 2012 and titled "Tamper Indication through a Pulse Interface," the contents of which are hereby incorporated by reference.

TECHNICAL FIELD

This disclosure relates generally to metering devices and more particularly relates to a tampering circuit for detecting tampering with a pulse-producing component of a metering device.

BACKGROUND

Metering devices are used to measure consumption of resources. Examples of metering devices include electricity meters, water meters, gas meters, steam meters, electronic volume correctors, etc.). A metering device may communicate consumption of a given resource through a pulse source communicating with a pulse-counting device via a pulse interface.

For example, FIG. 1 depicts a pulse source 102 communicating with a pulse-counting device 104 via a pulse interface 106. The pulse interface 106 may be configured to communicate a given unit of consumption by communicating a pulse corresponding to the given unit of consumption. A pulse source may be a metering device or any other device that produces pulses to indicate volume, consumption, events or alarms. The pulse-counting device 104 may be any electronic device configured to count or otherwise accumulate pulses received from the pulse-generating device. The accumulated pulses indicate total consumption. The pulse-counting device 104 may store counts and alarm events to be periodically read from the device. The pulse-counting device 104 may be included in a system such as an automated meter reading system that includes a radio transmitter for communicating alarms and other status reports.

The pulse source 102 may be geographically located in remote from the pulse-counting device 104. The pulse source 102 may connected to the pulse-counting device 104 via a cable 107 having one or more wires. These wires may experience damage from unintentional sources (e.g., storms and other natural events) and intentional source (e.g., deliberate tampering). Damage to the wires connecting the pulse interface 106 of the pulse source 102 with the pulse-counting device 104 may cause erroneous pulse counts.

Prior solutions for detecting tampering or other damage to the pulse source 102 or device including the pulse source 102 may involve connecting additional wires from the pulse interface 106 to the pulse-counting device 104. Signals on the additional wires are monitored by the pulse-counting device. For example, a magnetic tamper detection device using magnetic sensors may communicate a tamper condition detected by the magnetic sensors via additional wires connecting the sensors with the pulse-counting device. Another example of a tamper device involves detecting a "cover off" condition in which movement of one or more components (e.g., a housing or sensor) of a pulse interface 206 and/or pulse-producing device from its proper position is detected. A "cover off" condition may be detected with a magnet and reed switch, a tilt sensor, and/or a mechanical switch with spring lever, or some combination thereof. Such solutions for detecting the "cover off" condition may involve communicating one or more signals regarding the "cover off" condition-to the pulse-counting device via an additional wire. A deficiency of such solutions is that the additional wires may experience damage from unintentional sources (e.g., storms and other natural events) and intentional source (e.g., deliberate tampering).

Therefore, it is desirable to provide systems and methods for detecting tampering with a pulse-producing component of a metering device.

SUMMARY

Systems and methods are disclosed for detecting tampering with a pulse-producing component of an electrical device. An example electrical device includes a pulse-producing circuit and a tamper detection circuit. The pulse-producing circuit is configured for generating at least one pulse. The pulse-producing circuit includes a pulse interface via which the at least one pulse is communicated from the pulse-producing circuit. The tamper detection circuit is electrically connected to the pulse interface. The tamper detection circuit can be connected between a pulse-counting device and the pulse interface. The tamper detection circuit is configured for communicating the pulse to the pulse-counting device via at least one electrical path in the absence of a tampering condition. The tamper detection circuit is also configured for simulating damage to the pulse interface by modifying the at least one electrical path in response to the presence of the tampering condition.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where:

FIG. 23 is a block diagram of an example device having a two-wire pulse interface in a normally closed state connected to a pulse-counting device;

FIG. 24 is a graph of a normally closed wire of the two-wire pulse interface being set to a high level by a voltage bias during a pulse;

FIG. 25 is a graph of a common wire of the two-wire pulse interface being set to a low level by a voltage bias during a pulse;

FIG. 26 is a block diagram of a tamper detection circuit connected between a pulse-counting device and a two-wire pulse interface in a normally closed state;

FIG. 27 is a schematic diagram of an example tamper detection circuit connected to a two-wire pulse interface in a normally closed state;

FIG. 28 is a graph of voltage levels on a two-wire pulse interface in a normally closed state in the presence of a tampering condition;

FIG. 29 is a graph of voltage levels on a two-wire pulse interface in a normally closed state in the presence of a tampering condition;

DETAILED DESCRIPTION

Figure 1:
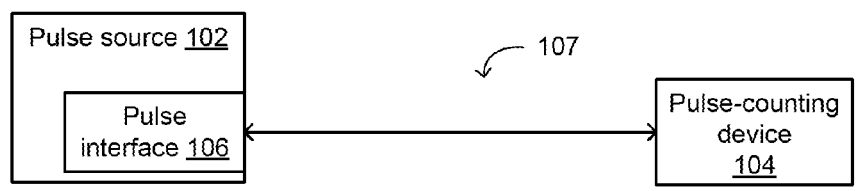
FIG. 1 is a block diagram of a pulse source communicating with a pulse-counting device via a pulse interface.

Systems and methods are provided for detecting tampering with a pulse-producing component of a metering device. For example, a metering device can be configured to communicate one or more tamper conditions on a wired pulse interface by mimicking broken or damaged pulse interface wires. Broken or damaged wires can be mimicked by using one or more switches in a tamper detection circuit that can be opened to mimic cut wires or closed to depict accidentally short-circuited wires. Mimicking broken or damaged pulse interface wires can allow tampering conditions to be detected without additional wires being connected between a pulse-producing device and a pulse-sensing device.

In accordance with some aspects, an electrical device is provided that includes circuitry for detecting tampering with a pulse-producing component. A non-limiting example of an electrical device is a metering device that includes a pulse-producing circuit or other component. The pulse-producing circuit is configured for generating pulses, such as (but not limited to) pulses used to measure consumption of resources such as water or electricity. The pulses can be communicated from the electrical device to a pulse-counting device, such as a computing device, that is positioned in a geographical location remote from the electrical device. The pulse-producing circuit includes a pulse interface via which the at least one pulse is communicated from the pulse-producing circuit. The electrical device also includes a tamper detection circuit that is electrically connected to the pulse interface. The tamper detection circuit can be connected between the pulse-counting device and the pulse interface. The tamper detection circuit is configured for communicating the pulse to the pulse-counting device via at least one electrical path in the absence of a tampering condition. The tamper detection circuit is also configured for simulating damage to the pulse interface by modifying the at least one electrical path in response to the presence of the tampering condition. The tamper detection circuit can use at least one common wire in the electrical path for communicating the pulse and simulating damage to the pulse interface In some aspects, the pulse-producing circuit can include a three-wire pulse interface with a single pole, double throw switch. An armature of the switch can be selectively moved between two contacts of the switch. Each contact can be connected to a separate wire. Each contact being in an open or closed state can respectively correspond to a high voltage level or a low voltage level being detected on the respective wire connected to the contact. The pulse-counting device can detect the voltage level. In normal operation, one contact is in an open state and the other contact is at a closed state. Simulating damage to the pulse interface can include setting both contacts to the same state.

In other aspects, the pulse-producing circuit can include a two-wire pulse interface with a single pole, single throw switch in a normally open state. The pulse-producing circuit can generate a pulse by closing the switch and re-opening the switch to the normal, open state. In some aspects, the switch can be closed for a predetermined duration corresponding to the pulse duration. Simulating damage to the pulse interface can include short-circuiting the switch such that the switch appears to be closed for longer than the predetermined duration corresponding to the pulse duration.

In other aspects, the pulse-producing circuit can include a two-wire pulse interface with a single pole, single throw switch in a normally closed state. The pulse-producing circuit can generate a pulse by opening the switch and re-opening the switch to the normal, closed state. Simulating damage to the pulse interface can include opening the switch such that the switch appears to be open for longer than the predetermined duration corresponding to the pulse duration.

These illustrative examples are given to introduce the reader to the general subject matter discussed here and are not intended to limit the scope of the disclosed concepts. The following sections describe various additional aspects and examples with reference to the drawings in which like numerals indicate like elements. The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Figure 2:
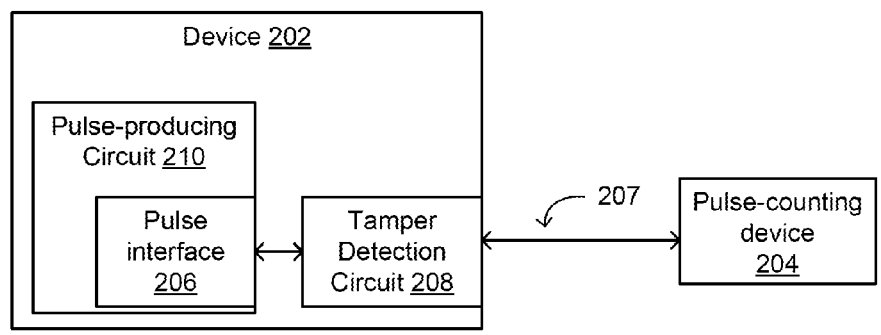
FIG. 2 is a block diagram of an electrical device communicating with a pulse-counting device via a pulse interface having a tamper detection circuit.

Referring now to the drawings, FIG. 2 is a block diagram depicting an electrical device 202 communicating with a pulse-counting device 204 via a pulse interface 206 having a tamper detection circuit 208.

A non-limiting example of a device 202 is a metering device including a magnetic rotation sensor. A magnetic rotation sensor can include a magnet attached to a rotating dial and a magnetic sensor mounted in proximity to the rotating dial attached to the magnet. Non-limiting examples of a magnetic sensor include a reed switch sensor, a Hall effect sensor, or Wiegand wire sensor. A magnetic rotation sensor can be interfered with or tampered with by bringing a magnet exerting a greater magnetic field than the magnet in proximity with the magnetic rotation sensor.

The device 202 can include a pulse-producing circuit 210 for monitoring units of temperature, pressure, rate of flow, and other conditions. The tamper detection circuit 208 can include one or more device configured to detect conditions that are beyond normal operating parameters. The tamper detection circuit 208 can generate an alarm and/or cause the pulse-counting device 204 to generate an alarm by simulating damage to the cable 207 connecting the device 202 and the pulse-counting device 204.

Figure 3:
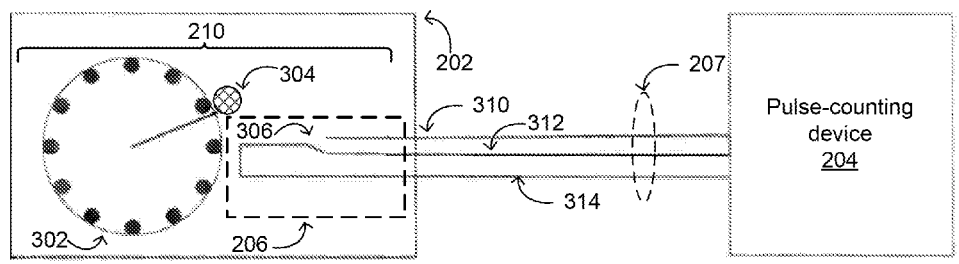
FIG. 3 is a block diagram of an electrical device having a three-wire pulse interface connected to a pulse-counting device.

In some aspects, the pulse interface 206 of the device 202 can include a three-wire interface. For example, FIG. 3 is a block diagram depicting an example device 202 having a three-wire pulse interface 206 connected to a pulse-counting device 204. The tamper detection circuit 208 is omitted from FIG. 3 for simplicity and to depict the normal operation of a device 202 connected to a pulse-counting device 204 in the prior art.

As depicted in FIG. 3, the pulse-producing circuit 210 includes the pulse interface 206 and a rotating dial pointer 302 attached to a magnet 304.

The pulse interface 206 can include a normally open wire 310, a normally closed wire 312, and a common wire 314. The normally open wire 310, the normally closed wire 312, and the common wire 314 can be connected to the pulse-counting device 204 via a cable 207 having three wires.

Figure 4:
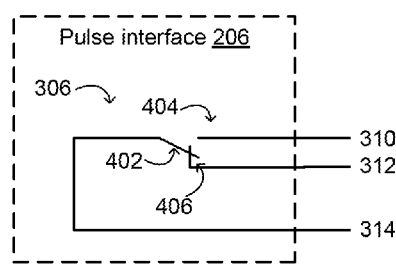
FIG. 4 is a schematic diagram of a pulse interface having a single pole, double throw switch connecting to three interface wires.

The pulse interface 206 can include a single-pole, double throw ("SPDT") switch 306. Non-limiting examples of the SPDT switch 306 include a Form C magnetic reed switch or Hall effect device. FIG. 4 is a schematic diagram depicting the pulse interface 206 including the SPDT switch 306. The SPDT switch 306 can include an armature 402, a normally open contact 404, and a normally closed contact 406. The rotating dial pointer 302 can be rotated to generate a pulse.

Rotating the rotating dial pointer 302 can bring the magnet 304 attached to the rotating dial pointer 302 in proximity to the pulse interface 206. The pulse interface 206 can change state in response to the magnet 304 being positioned in proximity to the SPDT switch 306. The pulse interface 206 changing state includes the armature 402 being switched between the normally open contact 404 and the normally closed contact 406. The three-wire pulse interface 206 communicates change in state to the pulse-counting device 204 via the cable 207.

Figure 5:
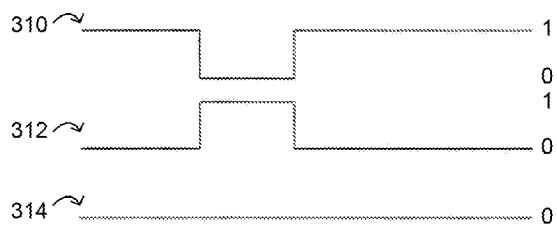
FIG. 5 is a graph of voltage levels corresponding to logical states on the wires of a three-wire pulse interface.

FIG. 5 is a graph depicting voltage levels on the wires 310, 312, 314 of the three-wire pulse interface 206. The magnet 304 being distant from the SPDT switch 306 can cause the armature 402 to be connected to the normally closed contact 406 and the normally open wire 310 to be disconnected from the common wire 314. The normally open wire 310 being disconnected from the common wire 314 can cause the voltage on the normally open wire 310 to be low (i.e., the "0" state) and the voltage on the normally closed wire 312 to be high (i.e., the "1" state). Rotating the rotating dial pointer 302 can bring the magnet 304 in proximity to the SPDT switch 306. The magnet 304 being near the SPDT switch 306 can cause the armature 402 to be connected to the normally open contact 404 and the normally open wire 310 to be connected to the common wire 314. The normally open wire 310 being connected to the common wire 314 can cause the voltage on the normally open wire 310 to be high (i.e., the "1" state) the voltage on the normally closed wire 312 to be low (i.e., the "0" state).

In a SPDT switch 306 (such as a Form C switch), respective voltages at the normally open contact 404 and normally closed contact 406 of the SPDT switch 306 are in opposite states. In normal operation, normally open contact 404 and normally closed contact 406 are not both open or both closed at the same time. The normally open contact 404 and normally closed contact 406 appearing to be open at the same time can be an indication to the pulse-counting device 204 that one or more of the wires 310, 312 has been cut or that other tampering has occurred. The normally open contact 404 and normally closed contact 406 appearing to be closed at the same time can be an indication to the pulse-counting device 204 that one or more of the wires 310, 312 is shorted to common wire 314.

Figure 6:
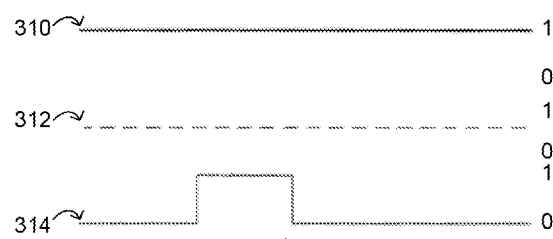
FIG. 6 is a graph of voltage levels corresponding to logical states on the wires of a three-wire pulse interface.

The pulse-counting device 204 may use any of a variety of impedance, voltage or current options to detect the state of the SPDT switch 306 and/or open or short conditions on the wires 310, 312. For example, FIG. 6 depicts voltage levels corresponding to logical states on the pulse interface 206. The bias impedances from the pulse-counting device 204 is configured to alternately cause the voltage on the normally open wire 310 and the normally closed wire 312 wires to be biased at a high voltage level on the open contact of the SPDT switch 306. The normally closed contact 406 of the SPDT switch 306 is tri-stated. Switching the normally open contact 404 to a closed state can cause the voltage on the common wire 314 to transition from a low level to a high level. The pulse-counting device 204 can respond by turning the bias off on the normally closed contact 406 and turning the bias on to the normally open contact 404.

Figure 7:
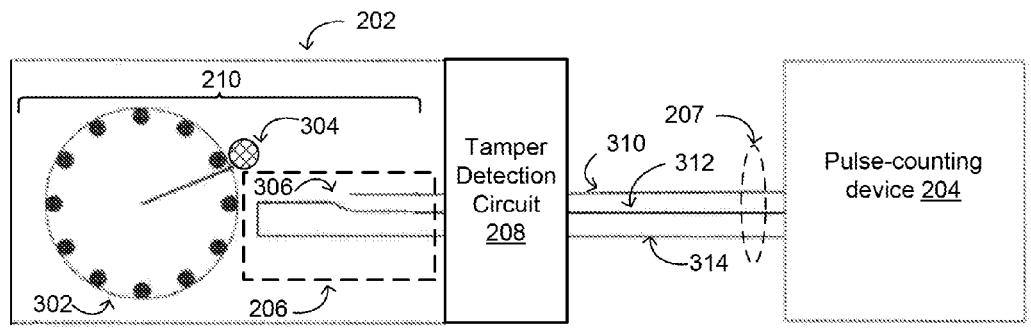
FIG. 7 depicts an electrical device having a tamper detection circuit connected between a three-wire pulse interface and the pulse-counting device.

FIG. 7 depicts a device 202 having the tamper detection circuit 208 connected between the pulse interface 206 and the pulse-counting device 204. The tamper detection circuit 208 can detect a tamper condition or other alarm condition. The tamper detection circuit 208 can communicate the alarm condition by causing the pulse interface 206 to appear to be damaged. Damage to the pulse interface 206 can cause various combinations of shorted leads. For example, the tamper detection circuit 208 can include one or more circuits for causing shorts between two or more of the wires 310, 312, 314. Shorts between two or more of the wires 310, 312, 314 can be interpreted by the pulse-counting device 204 as error conditions. The error conditions can be used to signal the pulse-counting device 204 that a tamper condition has been detected.

Figure 8:
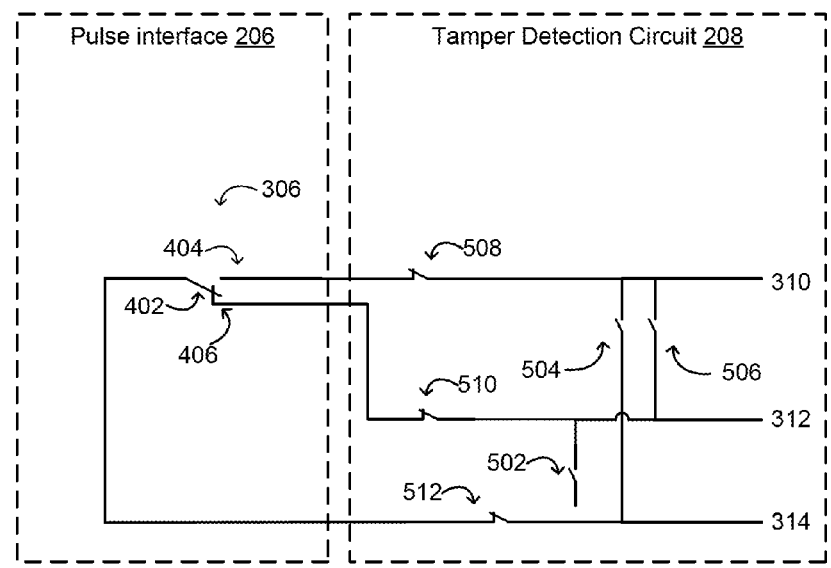
FIG. 8 is a schematic diagram of an example tamper detection circuit connected to a three-wire pulse interface.

FIG. 8 is a schematic diagram of an example tamper detection circuit 208. For example, as depicted in FIG. 8, the tamper detection circuit 208 can include switches 502, 504, 506, 508, 510, 512. The switch 502 can short the normally closed wire 312 to the common wire 314. The switch 504 can short the normally open wire 310 to the common wire 314. The switch 506 can short the normally open wire 310 to the normally closed wire 312. The switches 508, 510, 512 can respectively be positioned in series with the wires 310, 312, 314. In the absence of a tamper condition, each of the switches 508, 510, 512 can be in a closed position. In the presence of a tamper condition, each of the switches 508, 510, 512 can be in an open position.

Although FIG. 8 depicts the tamper detection circuit 208 as including all of the switches 502, 504, 506, 508, 510, 512, other implementations are possible. In additional or alternative aspects, the tamper detection circuit 208 can include one of the switches 502, 504, 506, 508, 510, 512 and/or any suitable combination of the switches 502, 504, 506, 508, 510, 512. The tamper detection circuit 208 can include any suitable combination of normally open switches and/or normally closed switches.

Figure 9:
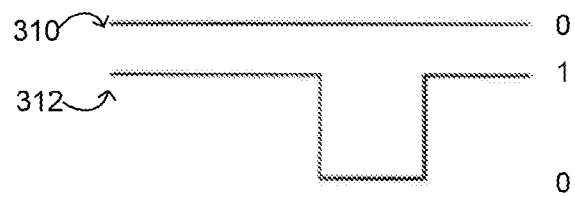
FIG. 9 is a graph of an example indication of a tamper condition in which the normally closed wire of a three-wire pulse interface is shorted to the common wire of the three-wire pulse interface.

FIG. 9 is a graph depicting an example indication of a tamper condition in which the normally closed wire 312 is shorted to the common wire 314. The normally closed wire 312 can be shorted to the common wire 314 by closing the switch 502.

Figure 10:
FIG. 10 is a graph of an example indication of a tamper condition in which the normally open wire of the three-wire pulse interface is shorted to the common wire of the three-wire pulse interface.

FIG. 10 is a graph depicting an example indication of a tamper condition in which the normally open wire 310 is shorted to the common wire 314. The normally open wire 310 can be shorted to the common wire 314 by closing the switch 504.

Figure 11:
FIG. 11 is a graph of an example indication of a tamper condition in which both the normally open wire and the normally closed wire of the three-wire pulse interface are shorted to the common wire of the three-wire pulse interface.

FIG. 11 is a graph depicting an example indication of a tamper condition in which both the normally open wire 310 and the normally closed wire 312 are shorted to the common wire 314. The normally open wire 310 and normally closed wire 312 can be shorted to the common wire 314 by closing the switches 502, 504.

Figure 12:
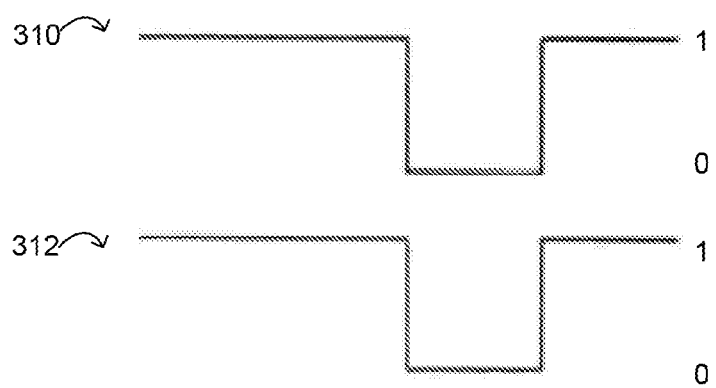
FIG. 12 is a graph of an example indication of a tamper condition in which the normally open wire of the three-wire pulse interface is shorted to the normally closed wire of the three-wire pulse interface.

FIG. 12 is a graph depicting an example indication of a tamper condition in which the normally open wire is shorted to the normally closed wire 312. The normally open wire 310 can be shorted to the normally closed wire 312 by closing the switch 506.

Figure 13:
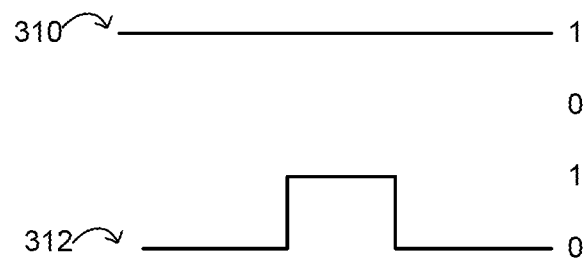
FIG. 13 is a graph of an example indication of a tamper condition in which the normally open wire of the three-wire pulse interface is open-circuited.

FIG. 13 is a graph depicting an example indication of a tamper condition in which the open switch 508 simulates a severed wire 310. The open switch 508 can simulate a severed wire 310 by causing the voltages on both the normally open wire 310 and the normally closed wire 312 to be at a high level in the absence of a pulse, rather than the voltage level on normally open wire 310 being at a low level during a pulse.

Figure 14:
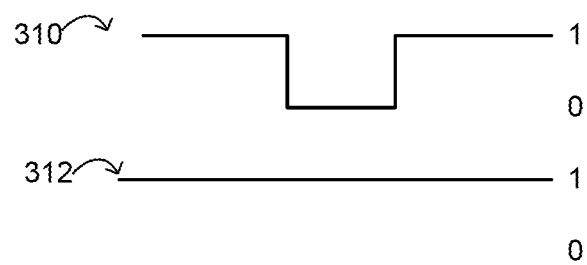
FIG. 14 is a graph of an example indication of a tamper condition in which the normally closed wire of the three-wire pulse interface is open-circuited.

FIG. 14 is a graph depicting an example indication of a tamper condition in which the open switch 510 simulates a severed wire 312. An open switch 510 can simulate a severed wire 312 by causing the voltages on the both the normally open wire 310 and the normally closed wire 312 to be at a high level at the same time during a pulse, rather than the voltage level on wire 312 being at a high level during a pulse and at a low level in the absence of a pulse.

Figure 15:
FIG. 15 is a graph of an example indication of a tamper condition in which the common wire of the three-wire pulse interface is open-circuited.

FIG. 15 is a graph depicting an example indication of a tamper condition in which the open switch 512 simulates a severed wire 314. An open switch 512 can simulate a severed wire 314 by causing the voltage level on both the normally open wire 310 and the normally closed wire 312 to be at a high level regardless of the presence or absence of a pulse.

A pulse interface 206 can periodically change a voltage bias on the normally open contact 404 and the normally closed contact 406 of the SPDT switch 306. Periodically changing the voltage bias allows for sensing the state of both of the normally open contact 404 and the normally closed contact 406. Periodically changing the voltage bias also allows for detecting open and shorted conditions on the wires 310, 312. For example, a battery-powered pulse-counting device 204, can apply voltage to the normally closed contact 406 to verify that the normally closed contact 406 is in a closed position during a period in which the normally open contact 404 is in an open position. Both the normally open contact 404 and the normally closed contact 406 being in an open position can indicate that one or more of the wires 310, 312, 413 and/or one or more wires of the cable 207 are cut. Both the normally open contact 404 and the normally closed contact 406 being in a closed position can indicate a short-circuit is present between one or more of the wires 310, 312, 413 and/or between one or more wires of the cable 207 are cut.

In additional or alternative aspects, the pulse-counting device 204 can use current sense operation on the wires 310, 312. The device 202 can have a predetermined internal impedance that can be measured by the pulse-counting device 204. Measuring the internal impedance of the device 202 can allow the pulse-counting device 204 to discriminate between a closed SPDT switch 306 and a shorted one of the wires 310, 312 caused by closing one or more of the switches 502, 504, 506, as described above with respect to FIGS. 8-12. The tamper detection circuit 208 can change the impedance in response to a tamper condition or other alarm condition. For example, the pulse-counting device 204 can detect one or more faults in cable 207 by a component having a predetermined impedance being positioned inside the pulse interface 206 and measuring the known impedance. Shorted and open wires inside cable 207 do not have the known impedance. One or more of the switches 502, 504, 506 connected in parallel with the impedance can be closed to short-circuit the known impedance. One or more of the switches 508, 510, 512 connected in series with the impedance can be opened to open-circuit the known impedance.

In additional or alternative aspects, the device 202 may include a diode. The pulse-counting device 204 can reverse bias the wires 310, 312 to detect the presence of the diode. Detecting the presence of the diode can allow the pulse-counting device 204 to discriminate between an open SPDT switch 306 and a cut wire caused by opening one or more of the switches 508, 510, 512, as described above with respect to FIGS. 8 and 13-15. In some aspects, the tamper detection circuit 208 can include a switch in a parallel electrical path with a diode of the device 202. The parallel electrical path can short-circuit the diode such that current can flow in either direction regardless of the presence of the diode. The tamper detection circuit 208 can close the switch in response to a tamper condition or other alarm condition. In additional or alternative aspects, the tamper detection circuit 208 can include a switch in series with the diode of the device 202. The series switch can open-circuit an electrical path including the diode such that the diode does not conduct current in either direction. The tamper detection circuit 208 can open the switch in response to a tamper condition or other alarm condition.

Figure 16:
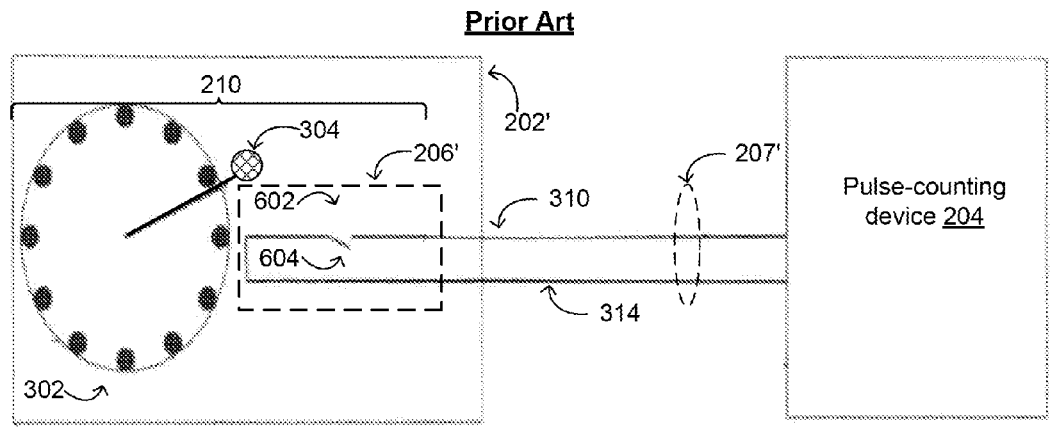
FIG. 16 is a block diagram of an example device having a two-wire pulse interface in a normally open state connected to a pulse-counting device.

In some aspects, the pulse interface 206 of the device 202 can include a two-wire interface in a normally open state. For example, FIG. 16 is a block diagram depicting an example device 202 having a two-wire pulse interface 206' in a normally open state connected to a pulse-counting device 204. The tamper detection circuit 208 is omitted from FIG. 16 for simplicity and to depict the normal operation of a device 202 connected to a pulse-counting device 204 in the prior art.

The two-wire pulse interface 206' can include a normally open wire 310 and a common wire 314. The normally open wire 310 and common wire 314 can be connected to the pulse-counting device 204 via a cable 207' having two wires.

The two-wire pulse interface 206' can also include a single pole, single throw ("SPST") switch 602 having an armature 604 in a normally open state. The SPST switch 602 can include any switching device that remains in an open state in the absence of a magnetic field. A non-limiting example of a SPST switch 602 having an armature 604 in a normally open state is a Form A magnetic reed switch.

A pulse can be generated by the opening and closing of the armature 604 of the SPST switch 602. The magnet 304 being distant from the SPST switch 602 can cause armature 604 to open. The magnet 304 being in proximity to the SPST switch 602 can cause armature 604 to close.

Figure 17:
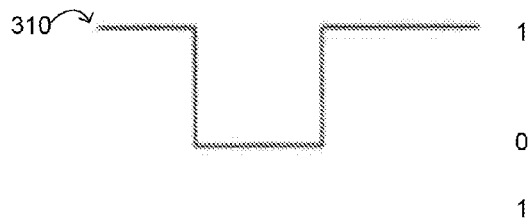
FIG. 17 is a graph of normal operation of a device having a two-wire pulse interface in which a voltage bias causes a low voltage level on a normally open wire of the two-wire pulse interface during a pulse.
Figure 18:
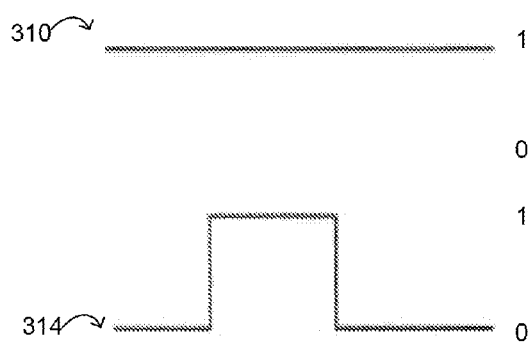
FIG. 18 is a graph of normal operation of a device having a two-wire pulse interface in which a voltage bias causes a high voltage level on a common wire of the two-wire pulse interface during a pulse.

The two-wire pulse interface 206' communicates the state of the SPST switch 602 to the pulse-counting device 204. The pulse-counting device 204 can provide a voltage bias across the wires 310, 314. Closing the SPST switch 602 can cause a short between the wires 310, 314. In some aspects, normal operation can include the pulse-counting device 204 providing a voltage bias that causes the voltage on the normally open wire 310 to be set to a low voltage level in response to the SPST switch 602 being closed, as depicted in the graph of FIG. 17. In some aspects, normal operation can include the pulse-counting device 204 providing a voltage bias that causes the voltage on the common wire 314 to be set to a high voltage level in response to the SPST switch 602 being closed, as depicted in the graph of FIG. 18.

Figure 19:
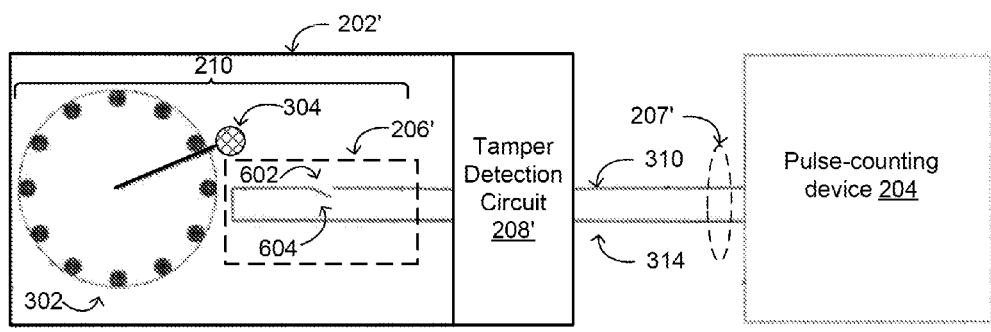
FIG. 19 is a block diagram of a tamper detection circuit connected between a pulse-counting device and a two-wire pulse interface in a normally open state.

FIG. 19 is a block diagram depicting the tamper detection circuit 208' connected between the pulse-counting device 204 and the two-wire pulse interface 206'. The tamper detection circuit 208' can detect a tamper condition or other alarm condition. The tamper detection circuit 208' can communicate an alarm condition by causing the two-wire pulse interface 206' to appear to be damaged.

Figure 20:
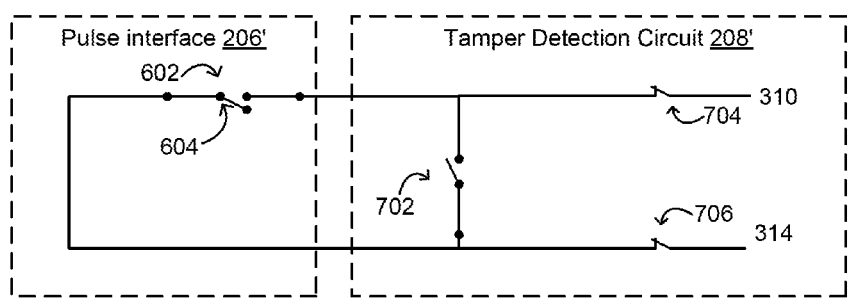
FIG. 20 is a schematic diagram of an example tamper detection circuit connected to a two-wire pulse interface in a normally open state.

FIG. 20 is a schematic diagram of an example tamper detection circuit 208' connected to the two-wire pulse interface 206'. The tamper detection circuit 208' can include switches 702, 704, 706. In normal operation, the switch 702 can be open and the switches 704, 706 can be closed. In response to a tamper condition or other alarm condition, the switch 702 can cause normally open wire 310 to be shorted to the common wire 314. Short-circuiting the normally open wire 310 to the common wire 314 via the switch 702 can cause the SPST switch 602 to be closed for a longer duration than a specified maximum duration of a pulse output from the device 202. Additionally or alternatively, in response to a tamper condition or other alarm condition, one or both of the switches 704, 706 can be opened, thereby causing indicate a tamper condition by creating an open lead fault.

Although FIG. 20 depicts the tamper detection circuit 208' as including all of the switches 702, 704, 706, other implementations are possible. In additional or alternative aspects, the tamper detection circuit 208 can include one of the switches 702, 704, 706 and/or any suitable combination of the switches 702, 704, 706. The tamper detection circuit 208' can include any suitable combination of normally open switches and/or normally closed switches.

Figure 21:
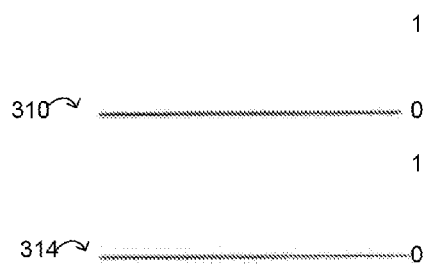
FIG. 21 is a graph of a shorted condition between a normally open wire and a common wire of a two-wire pulse interface caused by a tamper detection circuit for a bias voltage setting the normally open wire to a low voltage level during a pulse.

FIG. 21 is a graph depicting a shorted condition between the normally open wire 310 and the common wire 314 caused by the tamper detection circuit 208' for a bias voltage setting the normally open wire 310 to a low voltage level in response to the switch 702 being closed. The normally open wire 310 being set to a low voltage level for a longer duration than a specified maximum pulse duration can be interpreted by the pulse-counting device 204 as an error condition.

Figure 22:
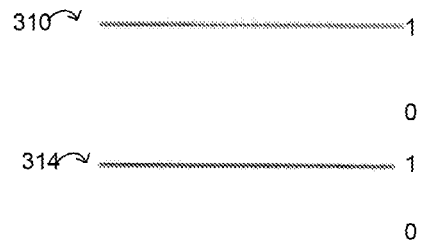
FIG. 22 is a graph of a shorted condition between a normally open wire and a common wire of a two-wire pulse interface caused by a tamper detection circuit for a bias voltage setting the common wire to a high voltage level during a pulse.

FIG. 22 is a graph depicting a shorted condition between the normally open wire 310 and the common wire 314 caused by the tamper detection circuit 208' for a bias voltage setting the common wire 314 to a high voltage level in response to the switch 702 being closed. The common wire 314 being set to a high voltage level for a longer duration than a specified maximum pulse duration can be interpreted by the pulse-counting device 204 as an error condition.

In additional or alternative aspects, the device 202' can include a diode in parallel with the switch 602. The pulse-counting device 204 can reverse bias the wires 310, 314 to detect the presence of the diode. Detecting the presence of the diode of the device 202' can allow the pulse-counting device 204 to discriminate between an open state of the SPST switch 602 and one of the wires 310, 314 being cut. The tamper detection circuit 208' can include a switch in a parallel electrical path with a diode of the device 202'. The parallel electrical path can short-circuit the diode. The tamper detection circuit 208' can close the switch in response to a tamper condition or other alarm condition.

In additional or alternative aspects, the device 202' may have a predetermined internal impedance. The pulse-counting device 204 can measure the internal impedance of the device 202' to discriminate between a closed state of the SPST switch 602 and a short in the normally open wire 310. The tamper detection circuit 208' can change the impedance in response to a tamper condition or other alarm condition.

In additional or alternative aspects, the pulse interface 206 of the device 202 can include a two-wire interface in a normally closed state. For example, FIG. 23 is a block diagram depicting an example device 202 having a two-wire pulse interface 206" in a normally closed state connected to a pulse-counting device 204. The tamper detection circuit 208 is omitted from FIG. 23 for simplicity and to depict the normal operation of a device 202 connected to a pulse-counting device 204 in the prior art.

The two-wire pulse interface 206" can include a normally closed wire 312 and a common wire 314. The normally closed wire 312 and common wire 314 can be connected to the pulse-counting device 204 via a cable 207' having two wires.

The two-wire pulse interface 206" can also include an SPST switch 802 having an armature 804 in a normally closed state. The SPST switch 802 can include any switching device that remains in a closed state in the absence of a magnetic field. A non-limiting example of a SPST switch 802 having an armature 804 in a normally closed state is a Form B magnetic reed switch.

A pulse can be generated by the opening and closing of the armature 804 of the SPST switch 802. The magnet 304 being in proximity to the SPST switch 802 can cause armature 804 to open. The magnet 304 being distant from the SPST switch 802 can cause armature 804 to close.

The pulse-counting device 204 may provide a voltage bias to the two-wire pulse interface 206". The SPST switch 802 being closed can short the normally closed wire 312 to the common wire 314, thereby removing or minimizing a voltage difference between the normally closed wire 312 and the common wire 314. Opening the SPST switch 802 can cause a voltage difference between the normally closed wire 312 and the common wire 314. In some aspects, the voltage bias can cause the normally closed wire 312 to be set to a high level in response to the SPST switch 802 being opened, as depicted in the graph of FIG. 24. In other aspects, the voltage bias can cause the common wire to be set to a low voltage level in response to the SPST switch 802 being opened, as depicted in the graph of FIG. 25.

In additional or alternative aspects, the pulse-counting device 204 may use current sense operation on the wires 312, 314. The device 202" may include a predetermined internal impedance. The pulse-counting device 204 can measure the internal impedance to discriminate between a closed SPST switch 802 and a short between the wires 312, 314.

In additional or alternative aspects, the device 202" may include a diode in parallel with the switch 802. The pulse-counting device 204 can reverse bias the wires 312, 314 to detect the presence of the diode. Detecting the presence of the diode can allow the pulse-counting device 204 to discriminate between an open SPST switch 802 and a cut in one or more of the wires 312, 314.

FIG. 26 is a block diagram depicting a tamper detection circuit 208" connected between the pulse-counting device 204 and the two-wire pulse interface 206". The tamper detection circuit 208" can detect a tamper condition or other alarm condition. The tamper detection circuit 208" can communicate an alarm condition by causing the two-wire pulse interface 206' to appear to be damaged.

FIG. 27 is a schematic diagram of an example tamper detection circuit 208" connected to the two-wire pulse interface 206". The tamper detection circuit 208" can include switches 902, 904. In normal operation, the switch 902 can be closed and the switch 904 can be opened. For a voltage bias causing the normally closed wire 312 to be set to a high level in response to the SPST switch 802 being opened, the switch 902 can be opened. Opening the switch 902 can cause the normally closed wire 312 to be set to a high level for a longer duration than a specified maximum duration of a pulse output from the device 202, as depicted in the graph of FIG. 28. The normally closed wire 312 being at a high voltage level for a longer duration than a specified maximum duration of a pulse output from the device 202 can be interpreted by the pulse-counting device 204 as an error condition. For a voltage bias causing the common wire 314 to be set to a low level in response to the SPST switch 802 being opened, the switch 904 can be closed. Closing the switch 904 can cause the common wire 314 to be set to a low level for a longer duration than a specified maximum duration of a pulse output from the device 202, as depicted in the graph of FIG. 29. The common wire 314 being at a low voltage level for a longer duration than a specified maximum duration of a pulse output from the device 202 can be interpreted by the pulse-counting device 204 as an error condition.

Figure 30:
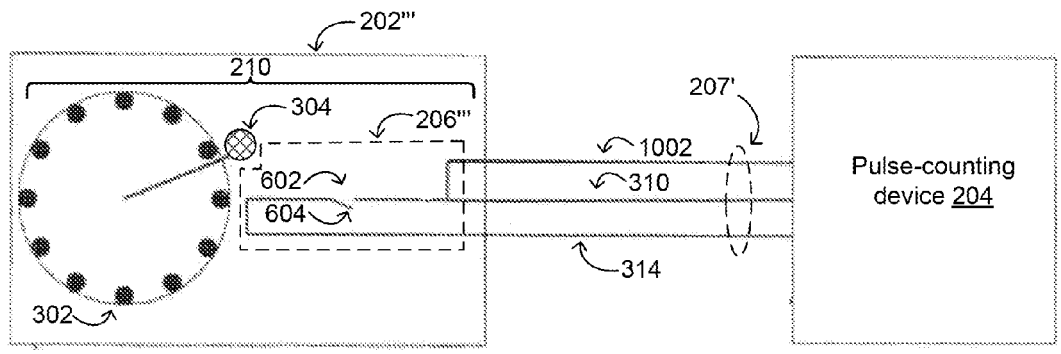
FIG. 30 is a block diagram of an example device having a three-wire pulse interface with a cut lead wire connected to a pulse-counting device.

In additional or alternative aspects, the pulse interface 206 can include a three-wire interface with a cut lead wire. For example, FIG. 30 is a block diagram depicting an example device 202''' having a three-wire pulse interface 206''' with a cut lead wire 1002 connected to a pulse-counting device 204. The tamper detection circuit 208 is omitted from FIG. 30 for simplicity and to depict the normal operation of a device 202''' connected to a pulse-counting device 204 in the prior art.

The three-wire pulse interface 206''' can include a normally open wire 310, a common wire 314, and a cut lead wire 1002. The three-wire pulse interface 206' can be connected to the pulse-counting device 204 via a cable 207 having three wires. The three-wire pulse interface 206''' can include a SPST switch 602 having an armature 604 in a normally open state.

The cut lead wire 1002 can be used to detect open or shorted conditions in the cable 207' connected to the three-wire pulse interface 206'''. The cut lead wire 1002 can be connected to the normally open wire 310 inside a body or other housing of the device 202'". In some aspects, the cut lead wire 1002 can be directly connected to the normally open wire 310. In other aspects, the cut lead wire 1002 can be connected to the normally open wire 310 via a predetermined impedance or diode. In additional or alternative aspects, the cut lead wire 1002 can be tied to the common wire 314 either directly or through a predetermined impedance or diode.

A pulse can be generated by the opening and closing of the armature 604 of the SPST switch 602. The magnet 304 being distant from the SPST switch 602 can cause armature 604 to open. The magnet 304 being in proximity to the SPST switch 602 can cause armature 604 to close. A pulse can correspond to the SPST switch 602 being closed.

Figure 31:
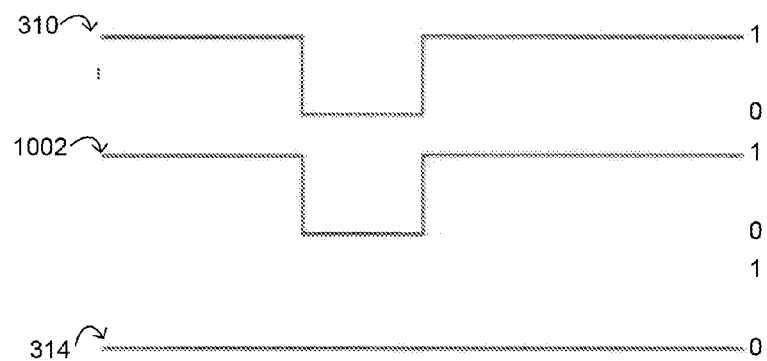
FIG. 31 is a graph of voltage levels on a normally open wire, a common wire, and cut lead wire of a three-wire pulse interface with a cut lead wire connected to a pulse-counting device.

FIG. 31 is a graph depicting voltage levels on the normally open wire 310, the cut lead wire 1002, and the common wire 314. The voltage on a cut lead wire 1002 that is connected to the normally open wire 310 can be the same as the voltage on the normally open wire 310 in the absence of an electrical fault on one or more of the wires 310, 314. The pulse-counting device 204 can bias the normally open wire 310 and the common wire 314 such that the normally open wire 310 is set to a low voltage level in response to the switch 602 being closed.

In some aspects, the cut lead wire 1002 can be connected to the common wire 314 inside the device 202'". The pulse-counting device 204 can bias the normally open wire 310 and the common wire 314 such that the common wire 314 is set to a high voltage level in response to the switch 602 being closed.

Figure 32:
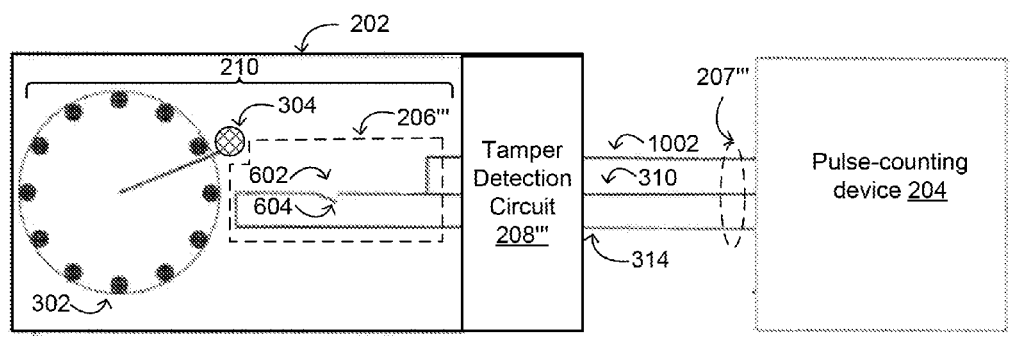
FIG. 32 is a block diagram of a tamper detection circuit connected between a pulse-counting device and a three-wire pulse interface with a cut lead wire connected to a pulse-counting device.

FIG. 32 depicts a device 202'" having a tamper detection circuit 208'" connected between the three-wire pulse interface 206'" and the pulse-counting device 204. The tamper detection circuit 208'" can detect a tamper condition or other alarm condition. The tamper detection circuit 208'" can communicate the tamper condition or other alarm condition by causing the three-wire pulse interface 206'" to appear to be damaged.

Figure 33:
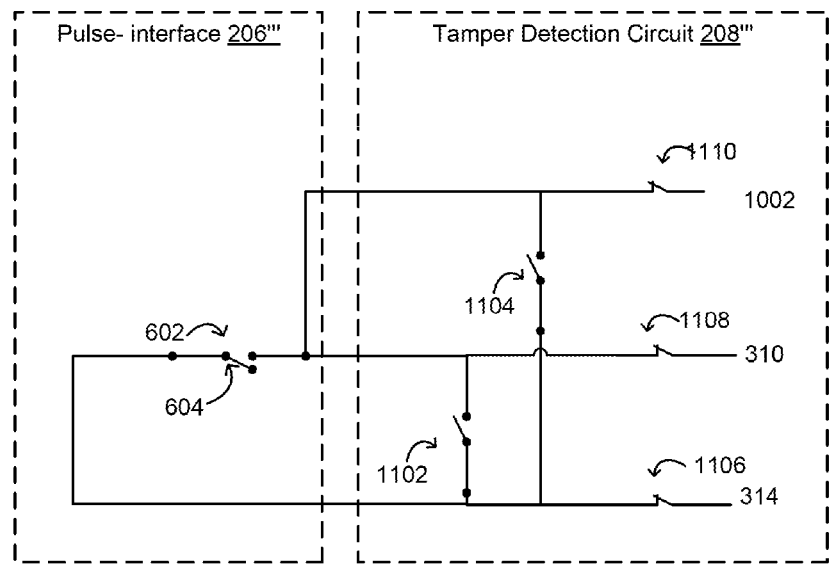
FIG. 33 is a schematic diagram of an example tamper detection circuit connected to a three-wire pulse interface with a cut lead wire connected to a pulse-counting device.

FIG. 33 is a schematic diagram depicting an example tamper detection circuit 208'". The tamper detection circuit 208'" can include switches 1102, 1104, 1106, 1108, 1110. The switches 1102, 1104 can be in an open state during normal operation of the device 202. Damage to the three-wire pulse interface 206'" can be simulated by short-circuiting the normally open wire 310 to the common wire 314. The normally open wire 310 can be shorted to the common wire 314 by closing the switch 1102. Damage to the three-wire pulse interface 206'" can also be simulated by short-circuiting the cut lead wire 1002 to the common wire 314. The cut lead wire 1002 can be shorted to the common wire 314 by closing the switch 1104. The switches 1106, 1108, 1110 can be in a closed state during normal operation of the device 202. Damage to the three-wire pulse interface 206'" can be simulated by open-circuiting one or more of the wires 310, 314, 1002. One or more of the wires 310, 314, 1002 can be open-circuited by opening a respective one or more of the switches 1106, 1108, 1110.

Although FIG. 33 depicts the tamper detection circuit 208'" as including all of the switches 1102, 1104, 1106, 1108, 1110, other implementations are possible. In additional or alternative aspects, the tamper detection circuit 208'" can include one of the switches 1102, 1104, 1106, 1108, 1110 and/or any suitable combination of the switches 1102, 1104, 1106, 1108, 1110. The tamper detection circuit 208'" can include any suitable combination of normally open switches and/or normally closed switches.

Switches in a tamper circuit can be actuated via any suitable mechanism and/or process. FIGS. 34-45 depict various examples of actuation mechanisms for switches in a tamper detection circuit 208.

Figure 34:
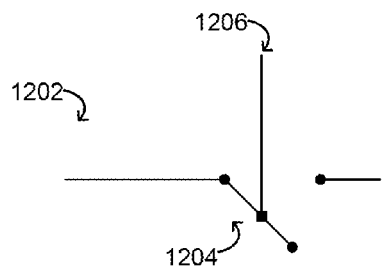
FIG. 34 is a schematic diagram depicting a switch usable in a tamper detection circuit and having a normally open state that can be actuated by a connector connected to an armature of the switch.
Figure 35:
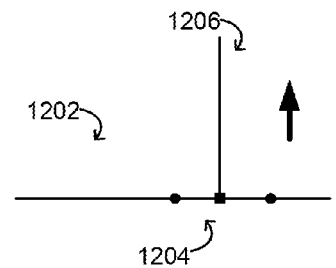
FIG. 35 is a schematic diagram depicting a switch usable in a tamper detection circuit and having a normally open state that is set to a closed state by a connector connected to an armature of the switch.

For example, FIGS. 34-35 depict a switch 1202 usable in a tamper detection circuit 208 and having a normally open state that can be actuated by a connector 1206 connected to an armature 1204 of the switch 1202. A first end of the connector 1206 can be physically connected or otherwise coupled to the armature 1204. A second end of the connector 1206 can be physically connected or otherwise coupled to another component of the device 202 that may be removed or otherwise manipulated by tampering with the device 202. For example, the second end of the connector 1206 can be connected to a cover of the device 202. Removing or otherwise manipulating the component coupled to the second end of the connector 1206 can exert a force on the armature 1204, as depicted by the upward arrow in FIG. 35. The forced exerted on the armature 1204 can move the armature 1204 to a closed position, as depicted in FIG. 35.

Figure 36:
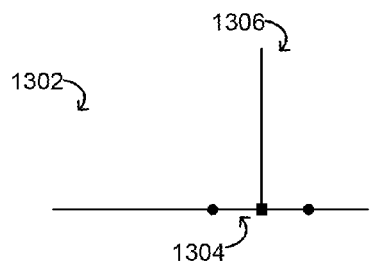
FIG. 36 is a schematic diagram depicting a switch usable in a tamper detection circuit and having a normally closed state that can be actuated by a connector connected to an armature of the switch.
Figure 37:
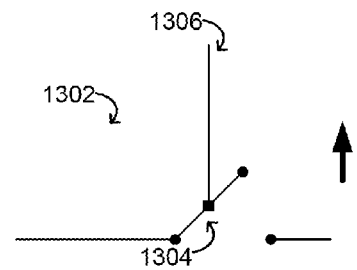
FIG. 37 is a schematic diagram depicting a switch usable in a tamper detection circuit and having a normally closed state that is set to an open state by a connector connected to an armature of the switch.

In another example, FIGS. 36-37 depict a switch 1302 usable in a tamper detection circuit 208 and having a normally closed state that can be actuated by a connector 1306 connected to an armature 1304 of the switch 1302. A first end of the connector 1306 can be physically connected or otherwise coupled to the armature 1304. A second end of the connector 1306 can be physically connected or otherwise coupled to another component of the device 202 that may be removed or otherwise manipulated by tampering with the device 202. Removing or otherwise manipulating the component coupled to the second end of the connector 1306 can exert a force on the armature 1304, as depicted by the upward arrow in FIG. 37. The forced exerted on the armature 1304 can move the armature 1304 to an open position, as depicted in FIG. 37.

FIGS. 34-37 depict normally open and normally closed options that might be used in detecting a "cover off" condition or removal of another component of a device 202 using a respective one of the connectors 1206, 1306 coupled to the respective armatures 1204, 1304 of the tamper switches 1202, 1302. In other embodiments, a magnet connected to a removable component of the device 202 can be used to actuate a tamper switch. For example, a tamper switch can be a magnetic reed switch actuated using a magnet that is attached to a cover or other removable component of a device 202. The cover or other removable component being present can cause the magnet to be near the reed switch, such that the switch is activated. The reed switch may be a normally open switch, as depicted in FIGS. 34-35. An example of a normally open switch is a Form A switch. The reed switch may alternatively be a normally closed switch, as depicted in FIGS. 36-37. An example of a normally closed switch is a Form B switch. Removing the cover or other removable component can remove the magnet. Removing the magnet can cause the tamper switch to change state, thereby indicating indicate the tamper condition.

In additional or alternative aspects, a tamper switch may be actuated by an external magnet used to tamper with the operation of the device 202. For example, a rotation sensing reed switch can be located closely enough to a rotating magnet such that the reed switch is actuated (i.e., switches between open and closed states) with each rotation. A magnetic tamper sensing reed switch can be positioned at a sufficient distance from the rotation sensing reed switch that the tamper sensing reed switch is not actuated by the rotating magnet. Placing a magnet placed near the rotation sensing switch with a greater magnetic force than the rotation sensing switch can actuate the magnet tamper sensing reed switch, thereby indicating a tamper condition.

Figure 38:
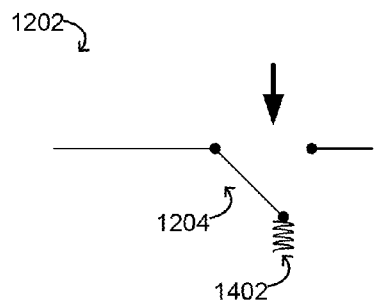
FIG. 38 is a schematic diagram depicting a switch usable in a tamper detection circuit and having a normally open state that can be actuated by a spring adjacent to an armature of the switch.
Figure 39:
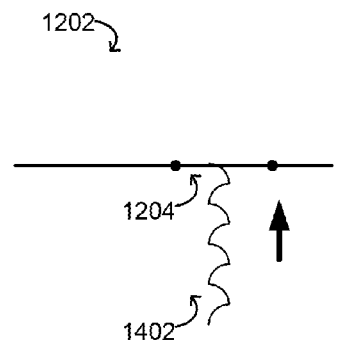
FIG. 39 is a schematic diagram depicting a switch usable in a tamper detection circuit and having a normally open state that is set to a closed state by a spring adjacent to an armature of the switch.

In another example, FIGS. 38-39 depict a switch 1202 usable in a tamper detection circuit 208 and having a normally open state that can be actuated by a spring 1402 adjacent to the armature 1204 of the switch 1202. A non-limiting example of a switch 1202 as depicted in FIGS. 38-39 is a spring level mechanical switch. A component of the device 202 that may be removed or otherwise manipulated by tampering with the device 202 (e.g., a cover) can apply a force compressing the spring 1402 in the absence of a tampering condition, as depicted by the downward arrow in FIG. 38. Tampering with the device 202 by removing or otherwise manipulating the component coupled to the second end of the connector 1206 can remove the force compressing the spring 1402. The removal of the force compressing the spring 1402 can allow the spring 1402 to expand, as depicted by the upward arrow in FIG. 39. Expansion of the spring 1402 can move the armature 1204 to a closed position, as depicted in FIG. 39.

Figure 40:
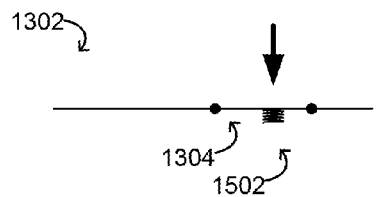
FIG. 40 is a schematic diagram depicting a switch usable in a tamper detection circuit and having a normally closed state that can be actuated by a spring adjacent to an armature of the switch.
Figure 41:
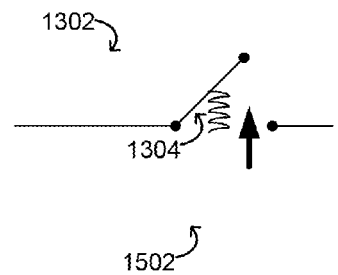
FIG. 41 is a schematic diagram depicting a switch usable in a tamper detection circuit and having a normally closed state that is set to an open state by a spring adjacent to an armature of the switch.

In another example, FIGS. 40-41 depict a switch 1302 usable in a tamper detection circuit 208 and having a normally closed state that can be actuated by a spring 1502 adjacent to the armature 1304 of the switch 1302. A non-limiting example of a switch 1302 as depicted in FIGS. 40-41 is a spring level mechanical switch. A component of the device 202 that may be removed or otherwise manipulated by tampering with the device 202 (e.g., a cover) can apply a force compressing the spring 1502 in the absence of a tampering condition, as depicted by the downward arrow in FIG. 40. Tampering with the device 202 by removing or otherwise manipulating the component coupled to the second end of the connector 1306 can remove the force compressing the spring 1502. The removal of the force compressing the spring 1502 can allow the spring 1502 to expand, as depicted by the upward arrow in FIG. 41. Expansion of the spring 1502 can move the armature 1304 to a closed position, as depicted in FIG. 41.

Figure 42:
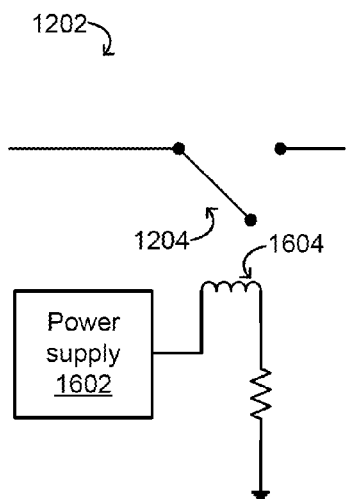
FIG. 42 is a schematic diagram depicting a switch usable in a tamper detection circuit and having a normally open state that can be actuated by an actuation coil.
Figure 43:
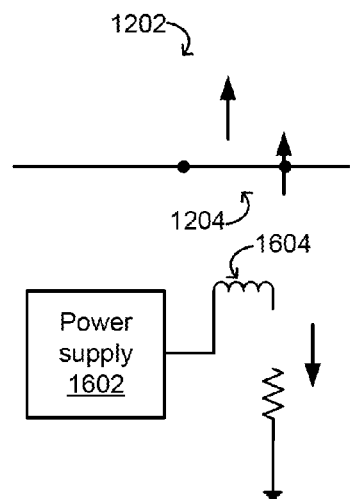
FIG. 43 is a schematic diagram depicting a switch usable in a tamper detection circuit and having a normally open state that is set to a closed state by an actuation coil.

In another example, FIGS. 42-43 depict a switch 1202 usable in a tamper detection circuit 208 and having a normally open state that can be actuated by a power supply 1602 providing a current through an actuation coil 1604. A non-limiting example of a switch 1202 as depicted in FIGS. 42-43 is a mechanical relay or a solid state relay switch. The power supply 1602 can include a power source of the device 202 or an dedicated power supply. The power supply 1602 can be included in the device 202 or be a separate device. The power supply 1602 can provide a current through an electrical path that includes the actuation coil 1604. Current flowing through the actuation coil 1604 can generate a magnetic field in the vicinity of the switch 1302. The magnetic field in the vicinity of the switch 1302 can cause the armature 1304 to remain in an open position. The removal or manipulation of a cover or other component of the device 202 can cause a break in the circuit path including the actuation coil 1604, as depicted by the downward arrow in FIG. 43. Breaking the circuit path including the actuation coil 1604 can cause current to cease flowing through the actuation coil 1604 and cease the magnetic force being exerted on the armature 1204. Ceasing the magnetic force being exerted on the armature 1204 can cause the armature 1204 to close, as depicted by the upward arrow in FIG. 43.

Figure 44:
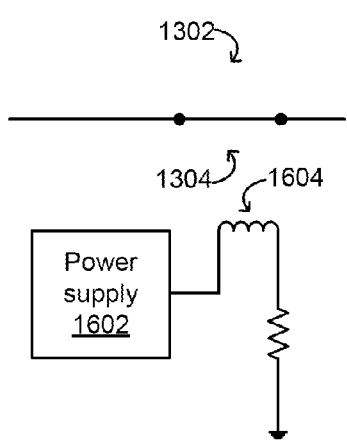
FIG. 44 is a schematic diagram depicting a switch usable in a tamper detection circuit and having a normally closed state that can be actuated by an actuation coil.
Figure 45:
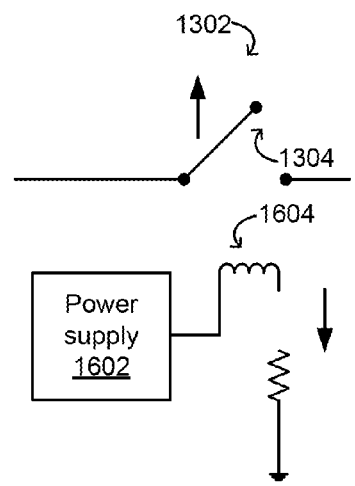
FIG. 45 is a schematic diagram depicting a switch usable in a tamper detection circuit and having a normally closed state that is set to an open state by an actuation coil.

In another example, FIGS. 44-45 depict a switch 1302 usable in a tamper detection circuit 208 and having a normally closed state that can be actuated by a power supply 1602 providing a current through an actuation coil 1604. A non-limiting example of a switch 1302 as depicted in FIGS. 44-45 is a mechanical relay or a solid state relay switch. Current flowing through the actuation coil 1604 can generate a magnetic field in the vicinity of the switch 1302. The magnetic field in the vicinity of the switch 1302 can cause the armature 1304 to remain in a closed position. The removal or manipulation of a cover or other component of the device 202 can cause a break in the circuit path including the actuation coil 1604, as depicted by the downward arrow in FIG. 45. Breaking the circuit path including the actuation coil 1604 can cause current to cease flowing through the actuation coil 1604 and cease the magnetic force being exerted on the armature 1304. Ceasing the magnetic force being exerted on the armature 1304 can cause the armature 1304 to open, as depicted by the upward arrow in FIG. 45.

In additional or alternative embodiments, other mechanisms can be used to actuate switches in a tamper detection circuit 208. One non-limiting example of an actuation mechanism is a magnet being positioned in the vicinity of the device 202. Another non-limiting example of an actuation mechanism is a tilt sensor included in the device 202. Switches in the tamper detection circuit 208 can change states in response to the tilt sensor detecting a change in the orientation of the device 202, such as may be caused by the removal of the device 202 from a mounted position.

Although the tamper detection circuit is described above with respect to pulse interfaces, other implementations are possible. In additional or alternative embodiments, a tamper detection circuit can be used to detect a tampering or other alarm condition for an analog interface. In one non-limiting example, analog interfaces (such as, but not limited to, a 4-20 mA standard analog sensor interface) vary current flow on a sensor input within a given range. A tamper detection circuit can short circuit the leads or other wires through which current flows on an analog interface. Short circuiting the leads or other wires through which current flows on an analog interface can cause an amount of current to flow which is outside the within a given range of current for the analog interface. The amount of current outside the within a given range of current for the analog interface can indicate an error condition. In another non-limiting example, a rotation sensor may be an analog Hall effect device configured to apply a voltage to one of the leads of cable 207. A tamper detection circuit can include short-circuit the lead to ground. Short-circuiting the lead to ground can cause a voltage to be detected that is outside the range of voltage across the leads of cable 207. A voltage that is outside the range of voltage across the leads of cable 207 can indicate an error condition.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A device comprising:
  a pulse-producing circuit configured for generating at least one pulse and comprising a pulse interface, wherein the at least one pulse is communicated via the pulse interface; and
  a tamper detection circuit electrically connected to the pulse interface and connectable between a pulse-counting device and the pulse interface, wherein the tamper detection circuit is configured for:
    communicating the at least one pulse to the pulse-counting device in an absence of a tampering condition via at least one electrical path, and
    simulating damage to the pulse interface by modifying the at least one electrical path in response to a presence of the tampering condition;
  wherein the pulse interface comprises:
    a switch comprising:
      a first contact electrically connectable to a first wire from the pulse-counting device,
      a second contact electrically connectable to a second wire from the pulse-counting device,
      an armature configured to selectively contact the first contact or the second contact such that a first voltage level on the first wire is different from a second voltage level on the second wire, and
      a third contact electrically connected to the armature and electrically connectable to a third wire from the pulse-counting device;
    wherein the tamper detection circuit is configured for simulating the damage to the pulse interface by causing the first voltage level on the first wire to be equal to the second voltage level on the second wire.

2. The device of claim 1, wherein the tamper detection circuit comprises at least one additional switch electrically connectable from at least one of the first wire or the second wire to the third wire and configured to short-circuit the at least one of the first wire or the second wire to the third wire in response to the presence of the tampering condition.

3. The device of claim 1, wherein the tamper detection circuit comprises at least one additional switch electrically connectable from the first wire to the second wire and configured for simulating the damage to the pulse interface by short-circuiting the first wire to the second wire in response to the presence of the tampering condition.

4. The device of claim 1,
  wherein the pulse interface comprises a switch electrically connectable between a first wire and a second wire and configured to generate the at least one pulse in response to the switch being closed;
  wherein the tamper detection circuit is configured for simulating the damage to the pulse interface by short-circuiting the first wire to the second wire in response to the presence of the tampering condition.

5. The device of claim 4, wherein the tamper detection circuit comprises at least one additional switch electrically connectable between the first wire and the second wire in parallel with the switch of the pulse interface and configured to selectively short-circuit the first wire to the second wire.

6. The device of claim 1,
  wherein the pulse interface comprises a switch electrically connectable between a first wire and a second wire and configured to generate the at least one pulse in response to the switch being opened;
  wherein the tamper detection circuit comprises at least one additional switch electrically connected in series with the switch of the pulse interface and configured for simulating the damage to the pulse interface by causing an open circuit between the first wire and the second wire in response to the presence of the tampering condition.

7. The device of claim 1,
  wherein the pulse interface comprises a switch electrically connectable between a first wire and a second wire and configured to generate the at least one pulse in response to the switch being opened;
  wherein the tamper detection circuit comprises at least one additional switch electrically connectable between the first wire and the second wire in parallel with the switch of the pulse interface and configured for simulating the damage to the pulse interface by short-circuiting the first wire to the second wire in response to the presence of the tampering condition.

8. The device of claim 1,
  wherein the pulse interface comprises a switch electrically connected in series with a first wire and a second wire and a third wire electrically connected to the first wire, wherein the first wire, the second wire, and the third wire are electrically connectable to the pulse-counting device via the tamper detection circuit;
  wherein the tamper detection circuit comprises at least one additional switch electrically connectable between at least one of the first wire or the third wire and the second wire and configured for simulating the damage to the pulse interface by short-circuiting the at least one of the first wire or the third wire to the second wire in response to the presence of the tampering condition.

9. A method comprising:
  generating, by a pulse-producing circuit, at least one pulse, wherein the at least one pulse is communicated via a pulse interface of the pulse-producing circuit; and
  providing a tamper detection circuit electrically connected to the pulse interface and connectable between a pulse-counting device and the pulse interface, wherein the tamper detection circuit is configured for communicating the at least one pulse to the pulse-counting device in the absence of a tampering condition, and
  simulating damage to the pulse interface in response to the presence of the tampering condition;
  wherein the pulse interface comprises:
  a switch comprising:
    a first contact electrically connectable to a first wire from the pulse-counting device,
    a second contact electrically connectable to a second wire from the pulse-counting device,
    an armature configured to selectively contact the first contact or the second contact such that a first voltage level on the first wire is different from a second voltage level on the second wire, and
    a third contact electrically connected to the armature and electrically connectable to a third wire from the pulse-counting device;

wherein simulating the damage to the pulse interface comprises causing the first voltage level on the first wire to be equal to the second voltage level on the second wire.

10. The method of claim 9,
wherein providing the tamper detection circuit comprises providing at least one additional switch electrically connectable from at least one of the first wire or the second wire to the third wire;
wherein causing the first voltage level on the first wire to be equal to the second voltage level on the second wire comprises short-circuiting the at least one of the first wire or the second wire to the third wire in response to the presence of the tampering condition.

11. The method of claim 9,
wherein providing the tamper detection circuit comprises providing at least one additional switch electrically connectable from the first wire to the second wire;
wherein causing the first voltage level on the first wire to be equal to the second voltage level on the second wire comprises short-circuiting the first wire to the second wire in response to the presence of the tampering condition.

12. The method of claim 9,
wherein the pulse interface comprises a switch electrically connectable between a first wire and a second wire and configured to generate the at least one pulse in response to the switch being closed;
wherein simulating the damage to the pulse interface comprises short-circuiting, by the tamper detection circuit, the first wire to the second wire in response to the presence of the tampering condition.

13. The method of claim 12, wherein providing the tamper detection circuit comprises providing at least one additional switch electrically connectable between the first wire and the second wire in parallel with the switch of the pulse interface.

14. The method of claim 9,
wherein the pulse interface comprises a switch electrically connectable between a first wire and a second wire and configured to generate the at least one pulse in response to the switch being opened;
wherein providing the tamper detection circuit comprises providing at least one additional switch electrically connected in series with the switch of the pulse interface;
wherein simulating the damage to the pulse interface comprises causing, by the at least on additional switch, an open circuit between the first wire and the second wire in response to the presence of the tampering condition.

15. The method of claim 9,
wherein the pulse interface comprises a switch electrically connectable between a first wire and a second wire and configured to generate the at least one pulse in response to the switch being opened;
wherein providing the tamper detection circuit comprises providing at least one additional switch electrically connectable between the first wire and the second wire in parallel with the switch of the pulse interface;
wherein simulating the damage to the pulse interface comprises short-circuiting, by the at least on additional switch, the first wire to the second wire in response to the presence of the tampering condition.

16. The method of claim 9,
wherein the pulse interface comprises a switch electrically connected in series with a first wire and a second wire and a third wire electrically connected to the first wire, wherein the first wire, the second wire, and the third wire are electrically connectable to the pulse-counting device via the tamper detection circuit;
wherein providing the tamper detection circuit comprises providing at least one additional switch electrically connectable between at least one of the first wire or the third wire and the second wire;
wherein simulating the damage comprises short-circuiting the at least one of the first wire or the third wire to the second wire in response to the presence of the tampering condition.

17. A system comprising:
a metering device configured to generate a plurality of pulses in response to measuring consumption, the metering device comprising:
a pulse-producing circuit configured for generating at least one pulse and comprising a pulse interface, wherein the at least one pulse is communicated via the pulse interface, and
a tamper detection circuit electrically connected to the pulse interface; and
a computing device communicatively coupled to the metering device via the tamper detection circuit and configured to count the plurality of pulses communicated from the metering device;
wherein the tamper detection circuit is connectable between a pulse-counting device and the pulse interface and is configured for:
communicating the plurality of pulses to the computing device via at least one electrical path in the absence of a tampering condition, and
simulating damage to the pulse interface by modifying the at least one electrical path in response to the presence of the tampering condition;
wherein the pulse interface comprises:
a switch comprising:
a first contact electrically connectable to a first wire from the pulse-counting device,
a second contact electrically connectable to a second wire from the pulse-counting device,
an armature configured to selectively contact the first contact or the second contact such that a first voltage level on the first wire is different from a second voltage level on the second wire, and
a third contact electrically connected to the armature and electrically connectable to a third wire from the pulse-counting device;
wherein the tamper detection circuit is configured for simulating the damage to the pulse interface by causing the first voltage level on the first wire to be equal to the second voltage level on the second wire.

18. The system of claim 17, wherein the tamper detection circuit comprises at least one additional switch electrically connectable from at least one of the first wire or the second wire to the third wire and configured to short-circuit the at least one of the first wire or the second wire to the third wire in response to the presence of the tampering condition.

19. The system of claim 17, wherein the tamper detection circuit comprises:
at least one additional switch electrically connectable from the first wire to the second wire and configured for simulating the damage to the pulse interface by short-circuiting the first wire an armature configured to selectively contact the first contact or the second contact such that a first voltage level on the first wire is different from a second voltage level on the second wire; and a third contact electrically connected to the armature and electrically connectable to a third wire from the pulse-counting device, wherein the tamper detection circuit is configured for simulating the damage to the pulse interface by causing the first voltage level on the first wire to be equal to the second voltage level on the second wire.

\* \* \* \* \*